United States Patent
Steuernagel (10) Patent No.: US 8,594,913 B2
(45) Date of Patent: Nov. 26, 2013

(54) METHOD AND DEVICE FOR DETERMINING AND PREDICTING A STARTING TORQUE OR A STARTING TORQUE CHARACTERISTIC CURVE REQUIRED FOR STARTING AN INTERNAL COMBUSTION ENGINE

(75) Inventor: Frank Steuernagel, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 567 days.

(21) Appl. No.: 12/808,848

(22) PCT Filed: Nov. 11, 2008

(86) PCT No.: PCT/EP2008/065313

§ 371 (c)(1),
(2), (4) Date: Nov. 1, 2010

(87) PCT Pub. No.: WO2009/080406

PCT Pub. Date: Jul. 2, 2009

(65) Prior Publication Data

US 2011/0040433 A1 Feb. 17, 2011

(30) Foreign Application Priority Data

Dec. 20, 2007 (DE) .......................... 10 2007 061 730

(51) Int. Cl.
*G06F 19/00* (2011.01)
*G06G 7/70* (2006.01)

(52) U.S. Cl.
USPC ............... 701/113; 701/1; 701/101; 701/102; 701/103; 701/114

(58) Field of Classification Search
None
See application file for complete search history.

(56) References Cited

U.S. PATENT DOCUMENTS

| | | | | |
|---|---|---|---|---|
| 6,077,186 A * | 6/2000 | Kojima et al. | ..... | 477/3 |
| 6,247,437 B1 * | 6/2001 | Yamaguchi et al. | ..... | 123/179.3 |
| 6,253,127 B1 | 6/2001 | Itoyama et al. | | |
| 6,504,327 B2 * | 1/2003 | Omata et al. | ..... | 318/139 |
| 6,616,569 B2 * | 9/2003 | Hoang et al. | ..... | 477/3 |
| 6,830,118 B2 | 12/2004 | Koelle et al. | | |
| 6,877,470 B2 | 4/2005 | Mitani et al. | | |
| 6,879,888 B2 * | 4/2005 | Ochiai et al. | ..... | 701/22 |
| 7,107,956 B2 * | 9/2006 | McGee et al. | ..... | 123/179.3 |
| 7,220,217 B2 * | 5/2007 | Tamai et al. | ..... | 477/183 |
| 7,528,570 B2 | 5/2009 | Schiller et al. | | |
| 2003/0000750 A1 | 1/2003 | Selbertz et al. | | |
| 2003/0088343 A1 | 5/2003 | Ochiai et al. | | |
| 2007/0119403 A1 | 5/2007 | Laubender | | |

FOREIGN PATENT DOCUMENTS

| | | |
|---|---|---|
| DE | 19949773 | 6/2000 |
| DE | 10246978 | 4/2004 |
| DE | 10345153 | 5/2004 |
| DE | 10317524 | 11/2004 |
| DE | 102007005241 | 8/2008 |
| EP | 1270933 | 1/2003 |
| EP | 1173674 | 3/2010 |
| JP | 2000-274273 | 10/2000 |
| JP | 2003-138958 | 5/2001 |
| JP | 2001-159384 | 6/2001 |
| WO | WO 2006/013166 | 2/2006 |

OTHER PUBLICATIONS

International Search Report, PCT International Patent Application No. PCT/EP2008/065313, dated Apr. 28, 2009.

* cited by examiner

*Primary Examiner* — Bhavesh V Amin
(74) *Attorney, Agent, or Firm* — Kenyon & Kenyon LLP

(57) ABSTRACT

A method and a device for determining, ascertaining and predicting at least one starting torque or starting torque characteristic curve required for starting an internal combustion engine for a vehicle, especially a hybrid vehicle having at least one internal combustion engine and at least one additional motor. The determination and the ascertainment of the starting torque or the starting torque characteristic curve are carried out during the operation of the vehicle. A method for operating at least one motor in a hybrid vehicle is also described.

11 Claims, 3 Drawing Sheets

METHOD AND DEVICE FOR DETERMINING AND PREDICTING A STARTING TORQUE OR A STARTING TORQUE CHARACTERISTIC CURVE REQUIRED FOR STARTING AN INTERNAL COMBUSTION ENGINE

FIELD OF THE INVENTION

The present invention relates to a method and, a device for determining and predicting a starting torque or a starting torque characteristic curve required to start an internal combustion engine for vehicles, especially hybrid vehicles in which, besides an internal combustion engine, an additional motor, especially an electric machine is provided as a drive assembly. Furthermore, the present invention relates to a method for operating at least one motor, particularly an electric machine, in a hybrid vehicle.

BACKGROUND INFORMATION

To start internal combustion engines, they are accelerated to a minimum starting rotational speed, and are subsequently started using an injection of fuel and ignition of the fuel. In the usual vehicles, whose sole drive assembly is an internal combustion engine, the internal combustion engine is started at the beginning of the trip and is normally shut down again after the vehicle destination has been reached. European Patent No. EP 1 173 674 describes that the initial torque required for overcoming the starting resistances and for accelerating the power train masses of the internal combustion engine is of different magnitudes. The magnitude of the starting resistances, such as the internal combustion engine compression, the piston friction and the bearing friction are furthermore functions, for instance, of the number of cylinders and the model of the internal combustion engine, the lubricant used, the current temperature and the starting motion. Thus, at extremely low temperatures, a particularly large initial torque has to be overcome, whereas an engine that is at operating temperature is able to be started at a lesser torque.

Starting systems for internal combustion engines are therefore dimensioned so that a reliable start is possible even at unfavorable conditions. At each start of the internal combustion engine, the maximum available energy is therefore made available, in order to accelerate the internal combustion engine to a minimum starting rotational speed, using its maximum torque, and thus to make possible a start, as described above, to the internal combustion engine.

In the case of hybrid vehicles, the start of the internal combustion engine may take place not only at the beginning of the trip, but at any time, at the latest, however, when driving purely electrically is no longer possible. The reason for this may be a battery charging state that is too low and/or a command by the driver that can no longer be implemented purely electrically. This may lead to very frequent starting and stopping procedures of the internal combustion engine during a vehicle trip.

In order for a reliable start of the internal combustion engine to be possible, a motor, particularly an electric machine, has to be present in the hybrid vehicle, which is able to raise the required starting torque at any time. If the internal combustion engine of a hybrid vehicle is started during the electrical driving operation, the start of the internal combustion engine impairs the electrical driving operation in such a way that a part of the available electrical energy is used for the start of the internal combustion engine. As a result, in the purely electrical driving operation, either this electrical energy has to be withdrawn from the vehicle's driven end of shaft power and/or it is constantly set aside or held in reserve for the internal combustion engine's start. This restricts the electrical driving operation, as a rule, for reasons of comfort, since the energy set aside or held in reserve may not, or rather cannot be used for electrical driving. Thus, for operating the vehicle, particularly in a torque-based control device, it is advantageous if one knows precisely the currently required starting torque at a current at a current rotational speed, in order to make possible a reliable internal combustion engine start and a maximally extended electrical driving operation. Multiplying the internal combustion engine starting torque by the engine's rotational frequency gives the engine's starting power. The engine's rotational frequency may be determined from the engine speed by using the circle constant n.

SUMMARY

The present invention relates to a method and a device for determining at least one starting torque or starting torque characteristic curve required to start an internal combustion engine. A starting torque characteristic curve is a curve, particularly a curve over time, of the torque required for starting the internal combustion engine during the starting process of the internal combustion engine. The starting torque required for starting an internal combustion engine is the maximum required torque required for the reliable starting of the internal combustion engine. The torque provided for starting an internal combustion engine should be equal to, or greater than the maximum of the torque required for the reliable starting of the internal combustion engine. This determination advantageously takes place in hybrid vehicles in which, besides the internal combustion engine, at least one additional drive assembly, especially a motor, such as an electric machine, is provided. According to the present invention, the determination of the required starting torque, or the starting torque characteristic curve, is carried out during the operation of the vehicle.

This means that the starting torque or the starting torque characteristic curve is not predefined in a fixed manner, but is currently adjusted during the operation of the vehicle to the instantaneous state of the vehicle, especially to the state of the internal combustion engine that is to be started. Thus, according to the present invention, a starting torque is not predefined in a fixed manner for the least favorable starting case that is dimensioned sufficiently great, but a starting torque or a starting torque characteristic curve is determined which is adjusted relatively precisely to the currently present state of the internal combustion engine.

This may take place especially by using a computer program in at least one active control device during the operation of the vehicle.

The phrase "during the operation of the vehicle" means that a vehicle is in operation as long as a control unit in the vehicle is actively supplied with current, by the control of which an immediate driving off of the vehicle is made possible. This is comparable to the usual vehicle, in which the vehicle is switched ready for operation using the ignition key, in particular, the internal combustion engine is started, or the vehicle is switched to be agile using a starting button.

The vehicle, in particular, goes into operation using a driver interaction which is characterized by a conscious putting into operation of the vehicle, especially via reaching the ignition key position "ignition on" and the particularly automatic activation of at least one control device as well as the activation of the computer program. It is thus particularly ensured that the first starting torques or starting torque characteristic curves ascertained are reliably available before the first internal combustion engine start.

The required starting torque for starting an internal combustion engine changes during the operation of the vehicle, and is therefore constantly ascertained currently during the operation of the vehicle. In an observation over time, the curve of the starting torque, the starting torque characteristic curve may particularly be ascertained from engine speed 0 to the idling speed. The occurring torque is composed, in particular, of static friction components, dynamic friction components, gas spring components and/or acceleration torque components of the internal combustion engine.

For the implementation, particularly average values of these components, may be summed up as a function of temperature and engine speed, and at least one control device, especially an engine control, may be provided. What is used for ascertaining the starting torque or the starting torque characteristic curve is particularly an engine speed detection beginning at 0 revolutions/min of the internal combustion engine, a time-based assignment of the internal combustion engine speed for ascertaining the angular acceleration of the internal combustion engine, the knowledge of the position of the internal combustion engine with respect to its operational dead centers (compression, expansion), the cylinder charge, the intake manifold pressure, the friction torque and/or the moment of inertia of the internal combustion engine, as well as the mass moments of inertia (particularly of the subassemblies and/or parts of the clutch) that are connected to the internal combustion engine. In particular, in the case of rapidly successive starting and stopping processes of the internal combustion engine, the cylinder charge may differ from the atmospheric pressure that sets in, in response to a longer standstill time, of the internal combustion engine. The intake manifold pressure may be used approximately, in particular, when a cylinder charge is not ascertained. In particular, auxiliary assemblies, which are mounted directly on the internal combustion engine and are operated by it, generate additional load torques at the internal combustion engine and these must, if necessary, be added separately to the internal combustion engine start when one calculates the starting torque or the starting torque characteristic curve. For a successful start of the internal combustion engine, the starting torque has to be equal to, or greater than the maximum required torque that is required for the cranking and starting of the internal combustion engine. If the torque made available corresponds to the torque required for starting the internal combustion engine, the starting process is perceived as being particularly comfortable, since the drive train is not accelerated to engine speeds that are too high or too low. This ascertained torque must consequently be held in reserve, and not be used for driving operation or for driving auxiliary assemblies. The more accurately the required starting torque, or its curve, that is to be held in reserve, is ascertained and allocated to a controller, the more accurately one is able to know the actually disposable torque for driving operation or for driving auxiliary assemblies, and is able to use them.

One advantage of the present invention is that the required starting torque or starting torque characteristic curve for the nearest start of the internal combustion engine is constantly known. Consequently, on the one hand, one may at all times carry out a reliable and comfortable start of the internal combustion engine, by driving the internal combustion engine using the starting torque or the starting torque characteristic curve ascertained, and on the other hand, the maximum disposable torque may be used for the driving operation and for driving the auxiliary assemblies.

In another development of the present invention, the required starting torque or starting torque characteristic curve is predicted, as a function of the starting torque or the starting torque characteristic curve for starting the internal combustion engine ascertained, in particular, the start targeting data of the internal combustion engine, especially the internal combustion engine start targeting speed and the internal combustion engine start acceleration being taken into account.

One generally should not specify in a fixed manner a starting torque that is sufficiently large for the most unfavorable starting case, but rather that a starting torque or a starting torque characteristic curve is predicted that is adjusted to the currently present state of the vehicle and the internal combustion engine. For implementing the holding in reserve of a starting torque, a predicted starting torque or a predicted starting torque characteristic curve of the internal combustion engine is ascertained, and it is ascertained based on current internal combustion engine operating parameters, that are not influenced, or little influenced, particularly the internal combustion engine temperature and/or predicted start targeting data of the internal combustion engine, particularly of the internal combustion engine starting targeting speed and of the internal combustion engine starting acceleration.

During the observation over time, the curve of the starting torque, the starting torque characteristic curve is constantly currently ascertained and predicted, especially at or beginning at engine speed 0 revolutions/min up to the automatic running of the internal combustion engine, at the latest. The more accurately the required starting torque, or the starting torque curve, that is to be held in reserve, is allocated to a controller, the more accurately one is able to know the actually disposable torque for driving operation and for driving auxiliary assemblies, and is able to use them.

A prediction of a starting torque or a starting torque characteristic curve to be held in reserve, therefore especially assumes the specification of start targeting data of the internal combustion engine, such as the angular acceleration and/or the targeting speed of the internal combustion engine, which have to be known before the internal combustion engine start. This requirement may be determined, for example, on a situation basis, by the evaluation of relevant parameters, particularly the operating situation and the vehicle situation, the driver adaptation as well as the driver command requirements. Examples from derived situations may be that low internal combustion engine start targeting speeds are reached faster by the internal combustion engine, in a given starting time duration, and, to do this, lower internal combustion engine speed gradients are required than higher target speeds, at which greater speed gradients become necessary.

One advantage of this embodiment of the present invention is that the required starting torque or the starting torque characteristic curve for the next start of the internal combustion engine is constantly known from the analysis of the preceding internal combustion engine start, by adaptation or adjustment of the starting torques and starting torque characteristic curve as known to date, as well as by the prediction of the starting torques and starting torque characteristic curves that are to be expected. Consequently, on the one hand, one may at all times carry out a reliable and comfortable start of the internal combustion engine, by driving the internal combustion engine using the starting torque or the starting torque characteristic curve ascertained, and on the other hand, the maximum disposable torque may be used for the driving operation and for driving the auxiliary assemblies.

In another version of the present invention, ascertaining of the required starting torque or of the starting torque characteristic curve is carried out during the operation of the vehicle beginning at an internal combustion engine speed of 0 revolutions/min.

The technical background of ascertaining the required starting torque or the starting torque characteristic curve, during the operation of the vehicle, beginning at an internal combustion engine speed of 0 revolutions/min, is the consideration of the internal combustion engine speeds beginning at 0 revolutions/min up to a determinable internal combustion engine speed in response to the ascertainment of the starting torques and the starting torque characteristic curves. In particular, the internal combustion engine speeds are considered up to a determinable point in time, however, at the latest, up to an automatic running of the internal combustion engine, at which no external starting torques are required to obtain the internal combustion engine speed level. At the latest, at the automatic running of the internal combustion engine, so-called drag torques of the internal combustion engine are provided to the control device, into which ideally the ascertained, predicted starting torques and starting torque characteristic curves go over seamlessly in their values.

One advantage of this embodiment of the present invention is that, based on being carried out during the operation of the vehicle, beginning at an internal combustion engine speed of 0 revolutions/min, the required starting torque or the starting torque characteristic curve to the next start of the internal combustion engine is constantly known. Consequently, on the one hand, one may at all times carry out a reliable and comfortable start of the internal combustion engine, by driving the internal combustion engine using the starting torque or the starting torque characteristic curve ascertained, and on the other hand, the maximum disposable torque may be used for the driving operation and for driving the auxiliary assemblies.

In another version of the present invention, the method for ascertaining the starting torque or the starting torque characteristic curve is distinguished by the ascertainment being repeated regularly.

The technical background of the repeated carrying out of the method is that the starting torque, required for starting an internal combustion engine during operation of the vehicle, changes. For this reason, this should constantly be currently ascertained during the operation of the vehicle, and taken into consideration at the next start of the internal combustion engine. One has the option of a regular repetition in time, so that there is always a current value present. Alternatively, the ascertainment may also be a part of a regularly repeating program sequence, whose individual steps are variable with time. As the simplest variant of the regularity, the respectively one-time carrying out of the method may be observed after shutting down the internal combustion engine.

One advantage of this embodiment of the present invention is that the required starting torque or starting torque characteristic curve for the nearest start of the internal combustion engine is constantly known, based on the regular carrying out of the method. Consequently, on the one hand, one may at all times carry out a reliable and comfortable start of the internal combustion engine, by driving the internal combustion engine using the starting torque or the starting torque characteristic curve ascertained, and on the other hand, the maximum disposable torque may be used for the driving operation and for driving the auxiliary assemblies.

Another specific embodiment of the present invention is characterized in that the ascertainment of the starting torque or the starting torque characteristic curve takes place as a function of at least one currently present operating parameter of the internal combustion engine. The following are regarded as relevant operating parameters for ascertaining the starting torque or the starting torque characteristic curve: the current angular position of the crankshaft, especially the shut-down position of the internal combustion engine, the temperature, the cylinder charge, the intake manifold pressure, the oil pressure, the oil quality, the time that has passed since the shutting down of the internal combustion engine, the speed of the internal combustion engine, the difference in speed between the crankshaft of the internal combustion engine and the drive train, the time until equal speed has been reached, the targeting speed for starting the internal combustion engine and/or the angular acceleration, especially the curve, of the crankshaft.

The technical background of the ascertainment of the starting torque or the starting torque characteristic curve as a function of at least one operating parameter is that the required starting torque for starting an internal combustion engine changes during the operation of the vehicle. Depending on the momentary value, each of the operating parameters influences the starting torque or the starting torque characteristic curve required to start the internal combustion engine.

One advantage of this embodiment of the present invention that, based on ascertaining the starting torque or the starting torque characteristic curve as a function of an operating parameter, the starting torque or starting torque characteristic curve is more accurately ascertained for the next start of the internal combustion engine, and thus a more reliable and more comfortable start is ensured, and also the utilization of the disposable torque is maximized for the driving operation and the driving of the auxiliary assemblies.

Another specific embodiment of the present invention is characterized in that the starting torque to be ascertained or the starting torque characteristic curve to be ascertained is determined. This is done in that, during the operation of the vehicle, the internal combustion engine is started using an initial torque, and the determination of the starting torque or the starting torque characteristic curve, that are to be ascertained, takes place as a function of the analysis of this starting process. In particular it is provided, in this context, that the initial torque be specified as a function of at least one instantaneously present operating parameter of the internal combustion engine.

The technical background of the determination of the starting torque or the starting torque characteristic curve is that, based on ageing processes, wear processes and/or other influences, the mechanical properties, of such as couplings and/or inertias in the drive train, change greatly. A worn clutch, for instance, may lead to no longer the entire starting torque raised by a motor being transferred to the internal combustion engine. Then again, defective bearings also lead to increased losses in the drive train. Both of the exemplary effects named lead to a significant increase in the required starting torque or starting torque characteristic curve, for example. Therefore, in order to determine the actually required starting torque or starting torque characteristic curve, the internal combustion engine is started using an initial torque and the starting curve of the internal combustion engine is analyzed. Generally, the required starting torque or the starting torque characteristic curve is a function of instantaneously present operating parameters. In particular, for this reason, the initial torque for starting the internal combustion engine is specified as a function of at least one momentarily present operating parameter of the internal combustion engine. In the same way, the evaluation of the analysis may be carried out as a function of at least one momentarily present operating parameter.

Alternatively, particularly for determining the required starting torque or starting torque characteristic curve, the internal combustion engine may be started using a predicted starting torque or starting torque characteristic curve, especially based on a known previous starting torque or starting torque characteristic curve corrected via adjusting values, and the starting curve of the internal combustion engine may be analyzed. From the analysis that has taken place, current adjustment values may be ascertained and used especially for correcting of the starting torque or the starting torque characteristic curve that are to be ascertained. In system faults, especially a clutch defect, the adaptation ascertainment may take place in a different way, so that system faults will not be learned into the starting torques or the starting torque characteristic curves of the internal combustion engine. This applies also when evaluating operating parameters, which are particularly detected as being implausible or faulty by the method or the system. The evaluation of the analysis is carried out particularly as a function of at least one currently present operating parameter.

One advantage of this embodiment of the present invention is that the actually required torque is determined based on the determination of the starting torque or the starting torque characteristic curve that are to be determined. In this context, ageing processes, which lead to changed mechanical properties of the drive train, are taken into account.

Another specific embodiment of the present invention for determining the starting torque or the starting torque characteristic curve that are to be determined, is characterized in that the determination takes place in three steps:

First, the internal combustion engine is started using an initial torque, at constant load on the drive train, especially in response to the separated end of shaft. In particular it is provided, in this context, that the initial torque be specified as a function of at least one instantaneously present operating parameter of the internal combustion engine.

In this context, the behavior over time of at least one operating parameter of the internal combustion engine is recorded, especially the speed of the internal combustion engine, during the starting process.

Thereafter, the starting torque to be ascertained or the starting torque characteristic curve to be ascertained is determined as a function of the recorded behavior over time. In particular it is provided in this instance that the recorded behavior over time is compared to a setpoint behavior, and the starting torque to be ascertained or the starting torque characteristic curve to be ascertained, are determined as a function of the comparison.

The technical background of the determination of the starting torque or the starting torque characteristic curve that are to be ascertained, is, as was mentioned above, the taking into account of ageing processes, wear processes and/or other influences that change the mechanical properties in the drive train. The analysis of the starting behavior of the internal combustion engine is carried out at constant load on the drive train, particularly in response to the separated end of shaft. Consequently, the starting torque characteristic curve ascertained is actually well-founded by the start of the internal combustion engine. Interfering influences on the part of the driven end of shaft, for instance caused by driving operation, or by the switching on or off by auxiliary assemblies, which lead to false interpretations, are thus eliminated. Generally, the required starting torque or the starting torque characteristic curve is a function of instantaneously present operating parameters. In particular, for this reason, the initial torque for starting the internal combustion engine is specified as a function of at least one momentarily present operating parameter of the internal combustion engine. By recording the behavior over time of at least one operating parameter of the internal combustion engine, especially the speed of the internal combustion engine, during the starting process, in response to a specified initial torque, one may draw a conclusion on the mechanical properties, especially inertias, mechanical couplings, and/or clutch slip, of the drive train. In particular, elasticities in the drive train (e.g. the state of the dual-mass flywheel) may lead to resonance manifestations and falsifications of the starting torque of the internal combustion engine. If, to simplify matters, dampings are not accounted for, elasticities in the drive train lead to no additional torque requirement, but to a torque-phase displacement having the behavior of a "reversible energy store" (spring brake). The inert masses may be calculated from the starting torque that is to be raised, based on the engine speeds and the angular accelerations. The elasticities may also be recorded with the aid of the known angular positions of the internal combustion engine and of the motor, and the actual starting torque characteristic curve may be determined correspondingly. Thereafter, the starting torque to be ascertained or the starting torque characteristic curve to be ascertained is determined as a function of the recorded behavior over time. In particular it is provided in this instance that the recorded behavior over time is compared to a setpoint behavior, and the starting torque to be ascertained or the starting torque characteristic curve to be ascertained, are determined as a function of the comparison.

In particular, the actual starting torque or starting torque characteristic curve, that are ascertained, are compared to filed or stored starting torques or starting torque characteristic curves in the control device. The deviations ascertained in the comparison may be used for the adaptation or adjustment of the filed or stored starting torques or starting torque characteristic curves, or may flow into the calculation of the current starting torques or starting torque characteristic curves from the stored starting torques or starting torque characteristic curves as adaptation values. Especially for the comparison of the starting torques or starting torque characteristic curves, maxima and/or minima of the starting torques or starting torque characteristic curves may be drawn upon according to the present invention. In particular, a subdivision into various starting phases, especially a static friction phase and a dynamic friction phase may be used for the allocation of the maxima and/or the minima. Especially a complete curve comparison of the starting torque characteristic curves may take place step-wise (discretely, value pair for value pair) or with the aid of analytical functions in the comparison of interpolation points.

One advantage of this embodiment of the present invention is that the actually required torque is determined based on the determination of the starting torque or the starting torque characteristic curve that are to be determined. In this context, ageing processes, which lead to changed mechanical properties of the drive train, are taken into account.

Alternatively, to determine the starting torque or the starting torque characteristic curve that are to be ascertained, these three steps may take place:

starting of the internal combustion engine using a predicted starting torque or starting torque characteristic curve, at a constant load on the drive train, especially in response to the separated end of shaft. In particular it is provided, in this context, that the torque be specified as a function of at least one instantaneously present operating parameter of the internal combustion engine.

recording the behavior over time of at least one operating parameter of the internal combustion engine, especially the speed of the internal combustion engine, during the starting process.

determining the starting torque that is to be ascertained or the starting torque characteristic curve as a function of at least one operating parameter recorded over time. in particular it is provided that one should correct or adapt the starting torque to be ascertained or the starting torque characteristic curve to be ascertained as a function of the result of a comparison of a recorded actual behavior over time to a setpoint behavior of an operating parameter, especially of the internal combustion engine speed and/or a comparison of a predicted starting torque to the actually raised engine torque.

Interfering influences on the part of the driven end of shaft, especially those caused by the vehicle drive, which are able to lead to faulty interpretations, are eliminated according to the specific embodiment described above. In order to guard against faulty interpretations, the switching on and off of auxiliary assemblies should be eliminated, ignored if it has little influence and/or should be included in the calculations if the influence in the ascertainment of the starting torque or the starting torque characteristic curve is known.

The technical background of the determination of the starting torque or the starting torque characteristic curve that are to be ascertained, is, as was mentioned above, the taking into account of ageing processes, wear processes and/or other influences that change the mechanical properties in the drive train. The analysis of the starting behavior of the internal combustion engine is carried out at constant load on the drive train, particularly in response to the separated driven end of shaft. Consequently, the starting torque characteristic curve ascertained is actually well-founded by the start of the internal combustion engine. Interfering influences on the part of the driven end of shaft, for instance caused by driving operation, or by the switching on or off by auxiliary assemblies, which lead to false interpretations, are thus eliminated. Generally, the required starting torque or the starting torque characteristic curve is a function of instantaneously present operating parameters. In particular, for this reason, the initial torque for starting the internal combustion engine is specified as a function of at least one momentarily present operating parameter of the internal combustion engine. By recording the behavior over time of at least one operating parameter of the internal combustion engine, especially the speed of the internal combustion engine, during the starting process, in response to a specified predicted starting torque, one may draw a conclusion on the mechanical properties, especially mechanical couplings, and/or clutch slip, of the drive train. Furthermore, elasticities in the drive train (especially the state of the dual-mass flywheel) may lead to resonance manifestations and falsifications of the starting torque or the starting torque characteristic curve of the internal combustion engine. If, to simplify matters, damping is not accounted for, less elastic elasticities in the drive train ideally lead to no additional torque requirement, but to a torque-phase displacement having the behavior of a "reversible energy store" (spring brake). This may be taken into account in the comparison described. The inert masses may be calculated out of the starting torque that is to be raised, based on the engine speeds and the angular accelerations. In the same way, the elasticities may be recorded and the actual starting torque or the actual starting torque characteristic curve may be appropriately determined, with the aid of the known angularities or angular positions of the internal combustion engine and the motor, especially the electric machine, in a hybrid vehicle (for instance, a hybrid vehicle having a separating clutch between the internal combustion engine and the motor). It is especially provided, in this instance, that because of the recorded behavior over time by an observation of the internal combustion engine start curve, adaptation or correction values may be determined which are calculated in with the further ascertainment and/or prediction of the starting torque or the starting torque characteristic curve. The adaptation or correction values are filed or stored in the control device, at the latest upon deactivation of the control device, especially at the end of the trip, and are available for ascertaining the first starting torque or starting torque characteristic curve at the beginning of the next trip. Consequently, the starting torque to be ascertained or the starting torque characteristic curve is determined as a function of the recorded behavior over time. In particular it is provided, in this instance, that the recorded behavior over time is compared to a setpoint behavior, and the starting torque to be ascertained or the starting torque characteristic curve to be ascertained, are determined as a function of the comparison.

In the analysis, in particular, the actual starting torque or starting torque characteristic curve, that are ascertained, are compared to filed or stored starting torques or starting torque characteristic curves in the control device. The deviations ascertained in the comparison may be used for the adaptation or adjustment of the filed or stored starting torques or starting torque characteristic curves, or may flow into the calculation of the current starting torques or starting torque characteristic curves from the stored starting torques or starting torque characteristic curves as adaptation values. Maxima and/or minima of the starting torques or starting torque characteristic curves may be drawn upon, especially for the comparison of the starting torques or starting torque characteristic curves. In particular, a subdivision into various starting phases, especially into a static friction phase and a dynamic friction phase may be used for the allocation of the maxima and/or the minima. Especially a complete curve comparison of the starting torque characteristic curves may also take place step-wise (discretely, value pair for value pair) or with the aid of analytical functions in the comparison of interpolation points.

One advantage of this embodiment of the present invention is, by an analysis or a comparison based on predicted ascertained starting torques or starting torque characteristic curves to the actually required internal combustion engine starting torques and/or based on a recorded operating parameter to a setpoint behavior of the operating parameter, especially the internal combustion engine speed during the internal combustion engine start, to determine adaptation or correction values which take into account, especially, ageing processes that lead to changed mechanical properties of the drive train, in the ascertainment of the starting torques or the starting torque characteristic curves.

One other specific embodiment of the present invention for determining the starting torque or the starting torque characteristic curve that are to be ascertained, is characterized in that the recorded behavior over time, especially the comparison, is drawn upon for diagnostic purposes. It is especially provided, in this context, that the presence of a specifiable deviation between the recorded behavior over time and the setpoint behavior is diagnosed as a fault.

The technical background of the use of the determination of the starting torque, or the starting torque characteristic curve, for diagnostic purposes, is the recognition of changes and/or defects based on ageing processes, wear processes and/or other influences which change the mechanical properties in the drive train. Deviations which exceed/fall below certain threshold values, especially of the torque, the engine speed and/or time durations, may be pointing out specific mechanical defects in the drive train, especially ageing clutches, damper elements, inertias and/or elasticities.

One advantage of this embodiment of the present invention is that, based on the recognition of changes and/or defects in the drive train, preventive countermeasures are carried out for the rectification and/or the prevention of breakdowns.

The ascertained adaptation values may alternatively be used for diagnostic purposes. It is especially provided in this instance that certain deviations of the adaptation values are able to be diagnosed as faults.

The technical background of the use of the starting torque, or the starting torque characteristic curve to be ascertained, for diagnostic purposes, is the recognition of changes and/or defects based on ageing processes, wear processes and/or other influences which change the mechanical properties in the drive train. Deviations which exceed/fall below certain threshold values, especially of the torque, the engine speed and/or time durations, may be pointing out specific mechanical defects in the drive train, especially ageing clutches, damper elements, inertias and/or elasticities.

One advantage of this embodiment of the present invention is that, based on the recognition of changes and/or defects in the drive train, preventive countermeasures are carried out for the rectification and/or the prevention of breakdowns. Furthermore, based on the recognized defects and/or the diagnoses made, starting and/or stopping processes of the internal combustion engine can no longer be carried out, triggered, requested and/or allowed, and have this be indicated to the driver via a driver information. The driver information is able to take place especially via a signal lamp. In the same way, the results of the diagnoses are able to be filed and/or stored in the control device.

Another specific embodiment of the present invention provides a method and a device for operating at least one motor in a hybrid vehicle, in which, besides the at least one motor, an internal combustion engine is provided, and the internal combustion engine is started using the at least one motor. The at least one motor in this instance is driven so that at least the starting torque, or starting torque characteristic curve, ascertained or predicted using an abovementioned method, is available. This happens especially if the internal combustion engine is not operated.

The technical background of the operation of a motor in such a way that the starting torque or starting torque characteristic curve, ascertained or predicted by an abovementioned method, is available is that, if necessary, the internal combustion engine is able to be started using the motor at any time. This is especially always necessary when the internal combustion engine is not operated. When the internal combustion engine is operated and is able to give off power, the reserve of the starting torque or the starting torque characteristic curve ascertained or predicted is not needed. The disposable torque of the at least one motor may then be used completely.

One advantage of this embodiment of the present invention is that, in this way, a reliable start of the internal combustion engine is ensured at all times. At the same time, it may be prevented that the driving comfort is impaired by a start of the internal combustion engine, since the ascertained or predicted starting torque or starting torque characteristic curve is available for the start of the internal combustion engine, and is not utilized for the electrical driving operation and/or for driving the auxiliary assemblies. In addition, it is made possible that the entire torque of the at least one motor, less the ascertained or predicted starting torque or starting torque characteristic curve is utilized for the electrical driving operation and/or for driving auxiliary assemblies.

Another specific embodiment of the present invention shows a method and a device for operating at least one motor in a hybrid vehicle, in which, besides the at least one motor, at least one internal combustion engine is provided. The internal combustion engine is started using the at least one motor, and for starting the internal combustion engine it is driven in such a way that the starting torque or the starting torque characteristic curve, ascertained or predicted using a method as recited in at least one of the preceding claims [sic], is supplied to the internal combustion engine.

The technical background of the operation of a motor in such a way that the internal combustion engine is started using the starting torque or starting torque characteristic curve, ascertained or predicted by an abovementioned method, is that, if necessary, the internal combustion engine is able to be started using the motor at any time.

One advantage of this embodiment of the present invention is that, in this way, a reliable start of the internal combustion engine is able to be carried out at all times. At the same time, it is prevented that the driving comfort is impaired by a start of the internal combustion engine, since the ascertained or predicted starting torque or starting torque characteristic curve, for the start of the internal combustion engine, to a great extent corresponds to the actual starting torque or the starting torque characteristic curve that is required for starting the internal combustion engine. In addition, it is made possible that the additionally available torque of the at least one motor, less the ascertained or predicted starting torque or starting torque characteristic curve is able to be utilized, even during the start of the internal combustion engine, for the electrical driving operation and/or for driving auxiliary assemblies.

BRIEF DESCRIPTION OF THE DRAWINGS

Exemplary embodiments of the present invention are shown in the figures and explained in greater detail below.

DETAILED DESCRIPTION OF EXAMPLE EMBODIMENTS

Figure 1:
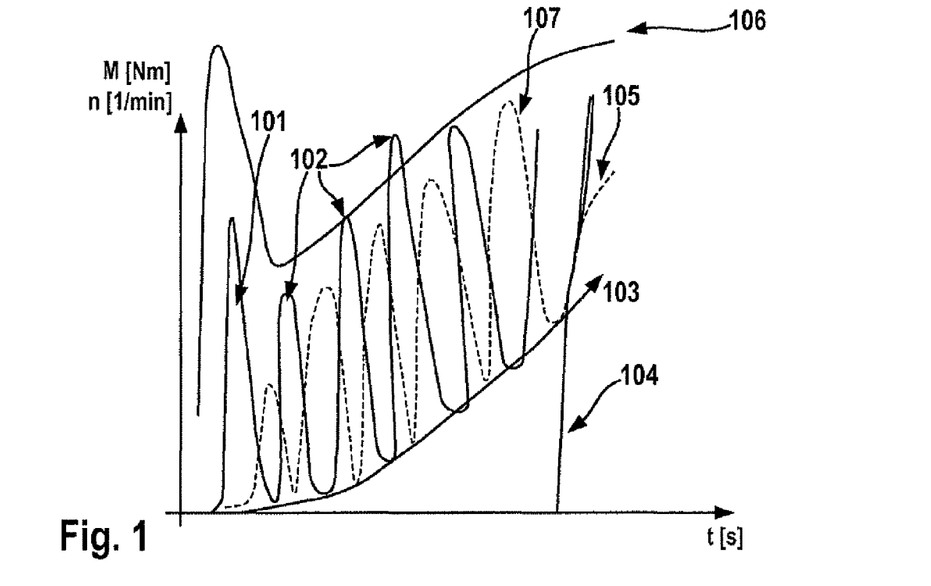
FIG. 1 shows the determined starting torque characteristic curve of a tow-started internal combustion engine that is to be ascertained or predicted.

In FIG. 1, for example, the determined starting torque characteristic curve that is to be ascertained and the speed over time of a tow-started internal combustion engine is shown. At 101, a large "breakaway torque" may be seen, which is composed especially of the torque for overcoming the static friction and/or the compression torque/expansion torque. Three cylinder charge-dependent compression torques/expansion torques are shown by 102. The torque requirement for overcoming the dynamic friction is shown by 103. All dynamic components include especially acceleration torques of the internal combustion engine, which are ascertainable especially with the aid of the difference of the current motor speed and the current internal combustion engine speed, the difference of the internal combustion engine start targeting speed and the current internal combustion engine speed and/or the angular acceleration. Dashed line 107 shows the speed curve of the internal combustion engine. At 104, the time of use of today's speed recording is drawn in (discontinuously known first speed value), which lead especially to the calculation of the first drag torque value, compare 105. Something similar applies analogously for an internal combustion engine that is running down. At 106, the certain starting torque characteristic curve, that is to be ascertained, is shown as an averaged drag torque requirement.

Figure 2:
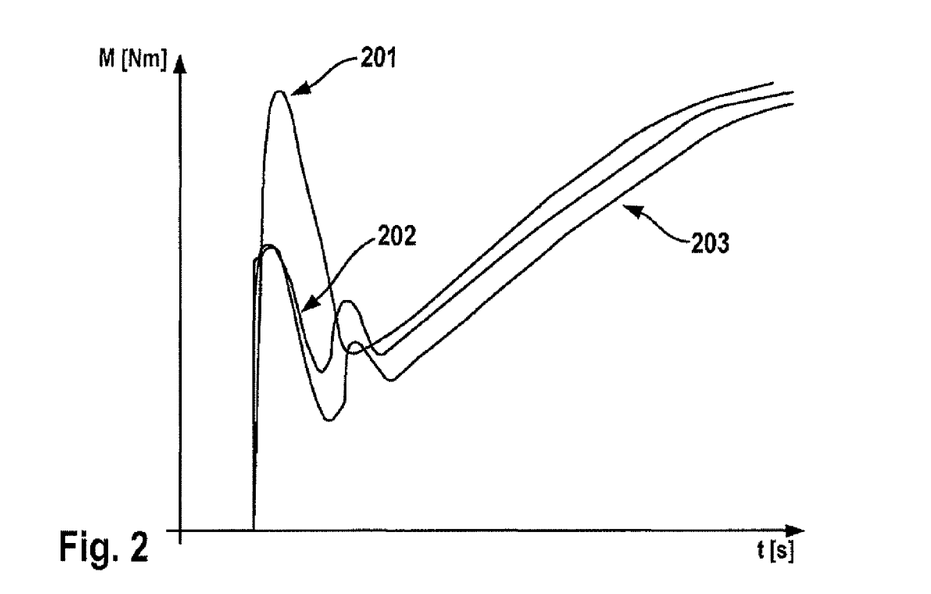
FIG. 2 shows determined starting torques or starting torque characteristic curves of an internal combustion engine that are to be ascertained or predicted.

In FIG. 2, curves 201, 202 and 203 show ascertained starting torques and starting torque characteristic curves. When taking into account different operating parameters and especially correction and/or adaptation values, there comes about from the determined starting torque characteristic curve, that is to be ascertained (e.g. 106), a family of curves (e.g. 201, 202, 203), the ascertained starting torques and starting torque characteristic curves. Based on the known position of the internal combustion engine, it is possible to adjust the course of the curve by the allocation of expansion torque requirement and/or compression torque requirement of the angular position. This generally has the effect of shifting the curve according to 106 in the direction of the time axis. Starting from curve 201, curve 202, based on the knowledge of the operational dead centers in the first torque to be overcome, is less, since at this point only the static friction is to be overcome, but, for instance, no compression torques (as in curve 201). Curve 203 represents curve 202 only as a function of the intake manifold pressure. Thus, the position is known with respect to static friction and compression, but the compression turns out lower, since it is able to be corrected via the intake manifold pressure. The intake manifold pressure may vary for different reasons, and it depends especially on the environmental pressure, the condition of the engine and/or the shut-down duration of the engine.

Figure 3:
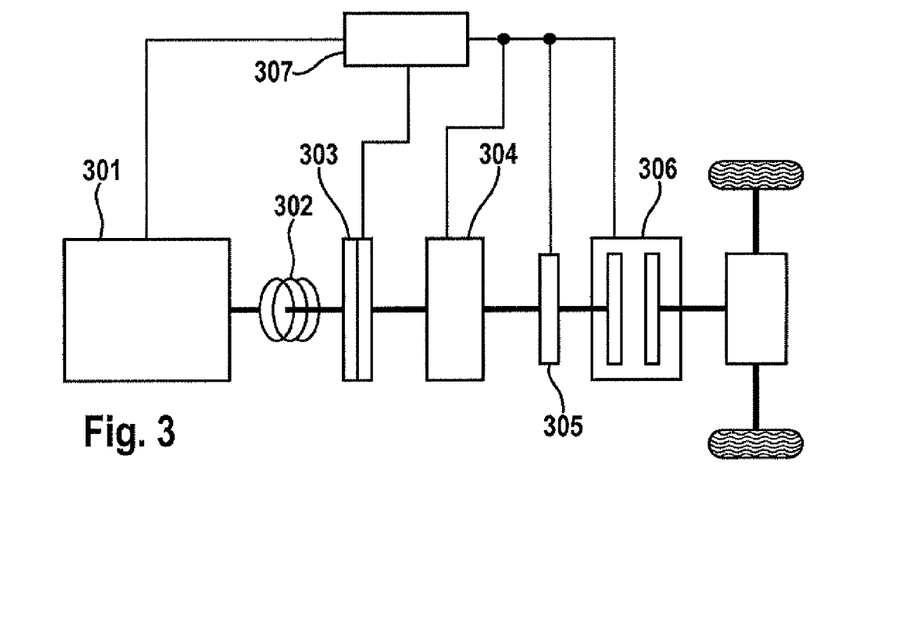
FIG. 3 shows a drive train of a hybrid vehicle in a parallel type of construction.

FIG. 3 shows a drive train of a hybrid vehicle in a parallel manner of construction. Reference numeral 307 shows the device which, using signal transmission, is able to communicate with auxiliary assemblies 301, 303, 304, 305 and 306, and is consequently able to exchange data and control commands, and carries out the methods described. 301 represents the internal combustion engine, 302 a closed elasticity, 303 a separating clutch between internal combustion engine 301 and motor 304, especially an electric machine. Numeral 305 shows a converter between motor 304 and transmission 306. In the hybrid vehicle, for instance, in parallel manner of construction, motor 304 accelerates internal combustion engine 301 for the starts of internal combustion engine 301. The effective torques may be ascertained via the measurement of the electric current and the voltage at motor 304, and the other functions participating in the system may be provided.

Figure 4:
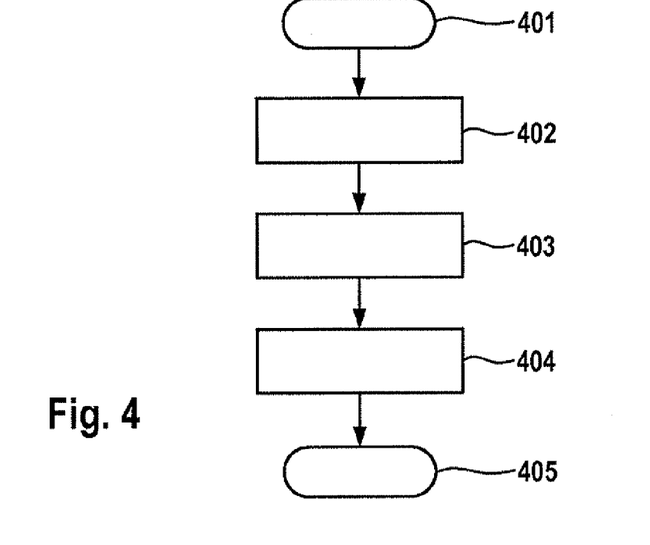
FIG. 4 shows a method for ascertaining a starting torque or a starting torque characteristic curve and for operating a motor in an hybrid vehicle.

FIG. 4 shows a method for ascertaining a starting torque or a starting torque characteristic curve and for operating a motor in an hybrid vehicle. The method begins with step 401. In step 402, the current operating parameters are read in which lead to a change in the starting torque or the starting torque characteristic curve. As a function of the operating parameters, the determined starting torque or starting torque characteristic curve, that are to be ascertained, change as a function of the operating parameters, (cf. 106) to the ascertained starting torques or starting torque characteristic curves (cf. 201, 202, 203). These operating parameters are especially the current angular position of the crankshaft, the temperature, the cylinder charge, the intake manifold pressure, the oil pressure, the oil quality, the time gone by since the shutting down of the internal combustion engine, the speed of the internal combustion engine, the difference in speed between the crankshaft of the internal combustion engine and the drive train, as well as the time duration until speed equality and/or the angular acceleration of the crankshaft. As a function of these operating parameters, the new current starting torque or the starting torque characteristic curve is ascertained in step 403, as described in FIG. 2. In step 404, the engine is now operated using the current engine torque. In this context the following applies: M(engine_current)<=M(engine_max)−M (start). The engine is thus operated using less torque or exactly the torque it is able to do maximally, less the starting torque or the starting torque characteristic curve to be held in reserve. The method ends with step 405. The steps mentioned may be cyclically repeated and processed. A reliable start of the internal combustion engine is thus advantageously assured at all times. At the same time, it is prevented that the driving comfort is impaired by a start of the internal combustion engine, since the ascertained or predicted starting torque or starting torque characteristic curve is available for the start of the internal combustion engine, and is not utilized for the electrical driving operation and/or for driving the auxiliary assemblies. In addition, it is made possible that the entire torque of the at least one motor, less the ascertained or predicted starting torque or starting torque characteristic curve is utilized for the electrical driving operation and/or for driving auxiliary assemblies.

Figure 5:
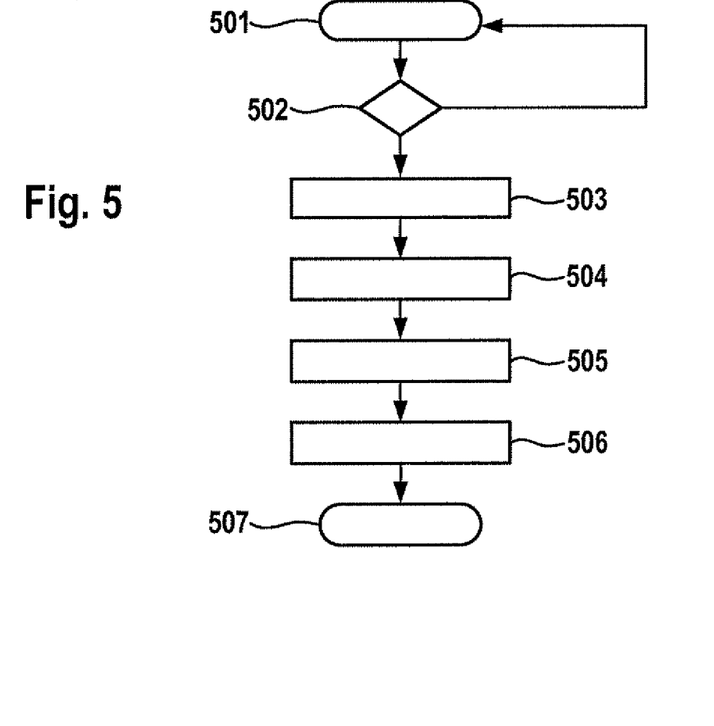
FIG. 5 shows a method for determining a starting torque or a starting torque characteristic curve of an internal combustion engine that is to be ascertained.

FIG. 5 shows a method for determining a starting torque or starting torque characteristic curve of an internal combustion engine 301 that are to be ascertained. The method begins with step 501. In step 502 it is checked whether there is a special operating situation, in which one may assume a constant driven end of shaft torque, and motor 304, especially the electric machine, does not give off any vehicle drive power. This special operating state may be present especially if the internal combustion engine is disengaged, and the transmission 306 is in neutral, the parking position, or a drive clutch, that is present but not shown in FIG. 3, is open. When the drive train is disengaged, one may assume a constant load in the drive train at a constant operation of the auxiliary assemblies. The torques and inertias of the transmission elements, such as the converter torques of the automatic transmission, are known. If such an especial operating situation is not present, the method returns to step 501. Apart from that, in step 503, an initial torque, especially a predicted starting torque or starting torque characteristic curve is supplied to internal combustion engine 301, using motor 304 and closing clutch 303. The starting process of the internal combustion engine resulting from this is analyzed in step 504. This takes place especially by recording the curve over time of the position of the crankshaft, the speed and/or the angular acceleration of the internal combustion engine. In step 505, the newly recorded data are calculated and thus determined, as a function of the current operating parameters to yield a new starting torque or starting torque characteristic curve that are to be ascertained. In step 506, the newly determined starting torque or starting torque characteristic curve, that are to be ascertained, are stored in a memory. The method ends with step 507. The steps mentioned may be cyclically repeated and processed.

Figure 6:
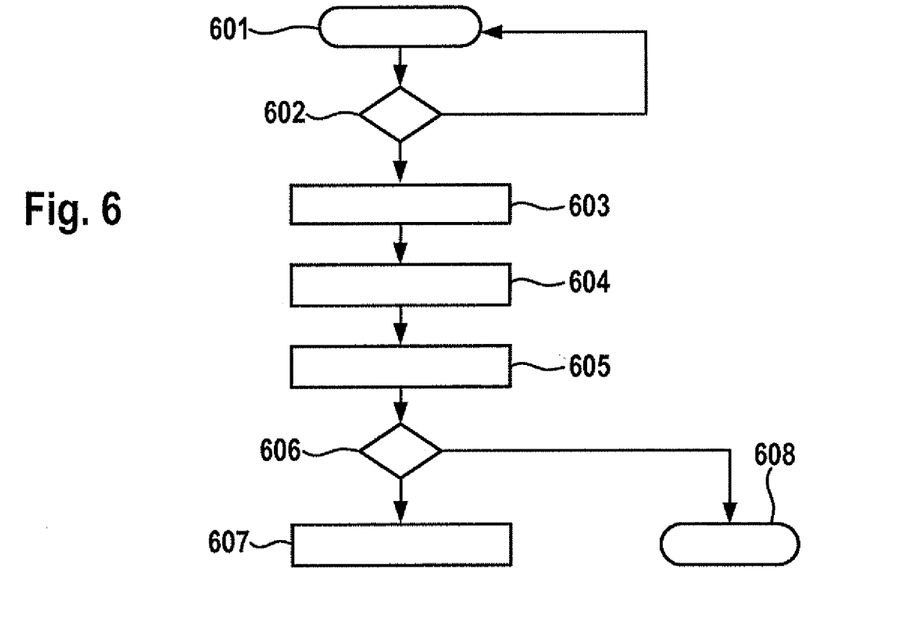
FIG. 6 shows a method for carrying out a diagnostic function.

FIG. 6 shows a method for carrying out a diagnostic function. Steps 601-604 correspond in content to method steps 501-504. In step 605, the deviation of the curve of the starting process is calculated using stored data. In step 606, it is checked whether the deviation exceeds or falls below certain threshold values. If this is the case, then in step 607, information is generated which points to a potential defect in the drive train, and this could especially be the activation of a warning lamp. If no threshold values are exceeded or undershot, the method ends in step 608. The steps mentioned may be cyclically repeated and processed.

What is claimed is:

1. A method for ascertaining at least one starting torque or starting torque characteristic curve required for starting an internal combustion engine for a hybrid vehicle having at least one internal combustion engine and at least one electric motor, the method comprising:
   ascertaining, by an engine control device, the starting torque or the starting torque characteristic curve during operation of the vehicle;
   wherein the starting torque or the starting torque characteristic curve required for starting the internal combustion engine is predicted as a function of the ascertained starting torque or the starting torque characteristic curve, the predicted starting torque also taking into account start targeting data of the internal combustion engine including a start targeting speed of the internal combustion engine and acceleration of the internal combustion engine start.

2. The method as recited in claim 1, wherein the ascertaining of the starting torque or the starting torque characteristic curve is carried out beginning at a speed of zero of the internal combustion engine.

3. The method as recited in claim 1, wherein the ascertaining is repeated regularly.

4. The method as recited in claim 1, wherein the ascertaining of the starting torque or the starting torque characteristic curve is a function of at least one instantaneously present operating parameter of the internal combustion engine, the at least one instantaneously present operating parameter of the internal combustion engine including at least one of a current angular position of a crankshaft, a temperature, a cylinder charge, an intake manifold pressure, an oil pressure, an oil quality, a time that has passed since a shutting down of the internal combustion engine, a speed of the internal combustion engine, a difference in speed between the crankshaft of the internal combustion engine and a drive train, a time until speed equality is reached, and an angular acceleration of the crankshaft.

5. The method as recited in claim 1, wherein the starting torque to be ascertained or the starting torque characteristic curve to be ascertained are determined in such a way that, during the operation of the vehicle, the internal combustion engine is started using an initial torque and the determination of the starting torque and the starting torque characteristic curve that are to be ascertained takes place as a function of an analysis of the starting an initial torque be specified as a function of at least one instantaneously present operating parameter of the internal combustion engine.

6. The method as recited in claim 1, wherein to ascertain the starting torque or the starting torque characteristic curve, the internal combustion engine is started using an initial torque, at constant load on the drive train, in response to the separated driven end of shaft, an initial torque be specified as a function of at least one instantaneously present operating parameter of the internal combustion engine, and a behavior over time of at least one operating parameter of the internal combustion engine is recorded, during the starting, the at least one parameter including a speed of the internal combustion engine, wherein the starting torque to be ascertained or the starting torque characteristic curve to be ascertained is determined as a function of the recorded behavior over time, the recorded behavior over time be compared to a setpoint behavior, and the starting torque to be ascertained or the starting torque characteristic curve to be ascertained, are determined as a function of the comparison.

7. The method as recited in claim 6, wherein the recorded behavior over time, and the comparison, is drawn upon for diagnostic purposes, a presence of a specifiable deviation between the recorded behavior over time and the setpoint behavior being diagnosed as a fault.

8. A method for operating at least one motor in a hybrid vehicle having at least one motor in addition to at least one internal combustion engine, the internal combustion engine being started using the at least one motor, the at least one motor being actuated in such a way that at least the starting torque or starting torque characteristic curve is available, the method comprising:
   ascertaining, by an engine control device, the starting torque or the starting torque characteristic curve during operation of the vehicle;
   wherein the starting torque or the starting torque characteristic curve required for starting the internal combustion engine is predicted as a function of the ascertained starting torque or the starting torque characteristic curve, the predicted starting torque also taking into account start targeting data of the internal combustion engine including a start targeting speed of the internal combustion engine and acceleration of the internal combustion engine start.

9. A device for ascertaining at least one starting torque or starting torque characteristic curve required for starting an internal combustion engine for a hybrid vehicle, the hybrid vehicle having at least one internal combustion engine and at least one additional motor, the device comprising:
   a component adapted to ascertain the starting torque or the starting torque characteristic curve during operation of the vehicle;
   wherein the starting torque or the starting torque characteristic curve required for starting the internal combustion engine is predicted as a function of the ascertained starting torque or the starting torque characteristic curve, the predicted starting torque also taking into account start targeting data of the internal combustion engine including a start targeting speed of the internal combustion engine and acceleration of the internal combustion engine start.

10. A device for operating at least one motor in a hybrid vehicle, including at least one motor in addition to at least one internal combustion engine, the internal combustion engine being started using the at least one motor, the device comprising:
    an arrangement to activate the at least one motor so that a starting torque or a starting torque characteristic curve is available; and
    a component to ascertain the starting torque or the starting torque characteristic curve during operation of the vehicle;
    wherein the starting torque or the starting torque characteristic curve required for starting the internal combustion engine is predicted as a function of the ascertained starting torque or the starting torque characteristic curve, the predicted starting torque also taking into account start targeting data of the internal combustion engine including a start targeting speed of the internal combustion engine and acceleration of the internal combustion engine start.

11. The device as recited in claim 10, wherein an arrangement to supply the starting torque or the starting torque characteristic curve to the internal combustion engine.

* * * * *

UNITED STATES PATENT AND TRADEMARK OFFICE
CERTIFICATE OF CORRECTION

PATENT NO. : 8,594,913 B2  
APPLICATION NO. : 12/808848  
DATED : November 26, 2013  
INVENTOR(S) : Frank Steuernagel Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 700 days.

Signed and Sealed this
Twenty-second Day of September, 2015

Michelle K. Lee
*Director of the United States Patent and Trademark Office*